United States Patent [19]

Hirata

[11] Patent Number: 5,354,393
[45] Date of Patent: Oct. 11, 1994

[54] METHOD FOR MANUFACTURING MAGNETIC TAPE CASSETTE

[75] Inventor: Hidetoshi Hirata, Kanagawa, Japan

[73] Assignee: Fuji Photo Film Co., Ltd., Kanagawa, Japan

[21] Appl. No.: 140,899

[22] Filed: Oct. 25, 1993

Related U.S. Application Data

[63] Continuation of Ser. No. 848,925, Mar. 10, 1992, abandoned.

[30] Foreign Application Priority Data

Apr. 16, 1991 [JP] Japan .................................. 3-109539

[51] Int. Cl.⁵ ............................................. B32B 31/00
[52] U.S. Cl. .......................... 156/192; 156/244.17; 156/245; 156/272.4; 156/275.1; 264/25
[58] Field of Search ............... 264/255, 328.8, 26, 264/25, 104, 105, 243, 248, 22; 156/192, 244.17, 245, 272.4, 275.1

[56] References Cited

U.S. PATENT DOCUMENTS

| | | | |
|---|---|---|---|
| 3,528,867 | 9/1970 | Leatherman et al. | 156/272.2 X |
| 3,671,621 | 6/1972 | Fukuoka | 264/255 X |
| 3,846,223 | 11/1974 | Lederman et al. | 264/105 X |
| 3,900,360 | 8/1975 | Leatherman | 156/309.9 X |
| 3,996,090 | 12/1976 | Leatherman | 156/272.4 X |
| 4,376,005 | 3/1983 | Vitellaro | 156/272.4 X |
| 5,123,989 | 6/1992 | Horiishi et al. | 156/272.4 |
| 5,161,346 | 11/1992 | Olson et al. | 156/272.4 X |

Primary Examiner—Chester T. Barry
Attorney, Agent, or Firm—Sughrue, Mion, Zinn, Macpeak & Seas

[57] ABSTRACT

A method for manufacturing a magnetic tape cassette incorporating and holding therein a tape winding member and having upper and lower half cases molded from a synthetic resin, wherein the upper and lower half cases are constructed such that conductive fillers form at least a joint between the cases. The components other than the magnetic tape are then inserted into the cassette and the halves are put one upon another prior to being heated by induction heating. Finally, the magnetic tape is wound onto the tape winding member.

10 Claims, 3 Drawing Sheets

METHOD FOR MANUFACTURING MAGNETIC TAPE CASSETTE

This is a continuation of application Ser. No. 07/848,925 filed Mar. 10, 1992, now abandoned.

BACKGROUND OF THE INVENTION

The present invention relates to a method for manufacturing a magnetic tape cassette incorporating and holding therein freely rotatable tape winding members or hubs and having upper and lower half cases formed from a synthetic resin.

Conventional magnetic tape cassettes such as those for audio and video equipment, computers and the like, include a magnetic tape wound around a tape winding member or members, for example, a hub, a reel or the like, such that the magnetic tape can be continuously advanced for recording and/or playback.

Conventional magnetic tape cassettes as described above typically include upper and lower half cases each formed from a synthetic resin such as acrylonitrile-butadiene-styrene copolymer resin (hereinafter referred to as "ABS" resin) or the like.

An audio tape cassette is an example of the conventional cassettes described above. As shown in FIG. 6, this magnetic tape cassette 41 is constructed such that a pair of hubs 43a and 43b, each having a magnetic tape wound therearound, are rotatably mounted in and held by a case body composed of upper and lower half cases 41a, 41b formed from ABS resin. After the upper and lower half cases 41a, 41b are respectively molded, the half cases are fastened together by a plurality of screws 44 (five screws as depicted in FIG. 6).

Conventional magnetic tape cassettes, one example of which includes the audio tape cassette above, contain relatively small-sized parts such as the screws 44 in FIG. 6. Furthermore, the conventional cassette case requires boss portions into which the screws 44 are inserted and recessed portions which prevent the heads of the screws 44 from projecting above the surface of the cassette. As a result, the cassette case has a relatively complicated structure.

Furthermore, in fastening the upper and lower half cases 41a, 41b together by means of screws 44, uneven contact pressures result between the contact surfaces of the upper and lower half cases in accordance with the fastening forces. For example, in the vicinity of the screws 44, the contact pressures are high. By way of contrast, the contact pressures are lowest at a midpoint between adjacent screws.

Furthermore, the fastening pressures on the contact surfaces of the upper and lower half cases 41a, 41b will vary in accordance with temperature changes in the environment in which the cassette is used. The tape cassette 41 may therefore be easily deformed especially with respect to relatively large cassette cases, such as VHS tape cassettes, where the distance between adjacent screws is typically 160 mm or more.

SUMMARY OF THE INVENTION

The present invention is designed to eliminate the drawbacks found in the above-mentioned conventional magnetic tape cassette manufacturing method. Accordingly, an object of the present invention is to provide a method for manufacturing a magnetic tape cassette which avoids generating the uneven stresses between the joint of the upper and lower half cases. Another objective is to provide cassette cases which can be securely fastened together.

In order to achieve the above objectives, the present invention employs a method for manufacturing a magnetic tape cassette having a magnetic tape, a tape winding member around which a magnetic tape is wound, and a cassette case comprising upper and lower half cases molded from a synthetic resin, characterized by the steps of: molding at least the joint of the two half cases such that the joint includes a conductive filler therein, putting the upper half cases upon the lower one, and heating the half cases by induction heating to thereby bond and fix them together.

BRIEF DESCRIPTION OF THE DRAWINGS

A thorough understanding of the present invention, including its objectives, features and advantages, will be readily apparent from consideration of the following figures in conjunction with the detailed description below, wherein.

DESCRIPTION OF THE PREFERRED EMBODIMENT

The following is a detailed description of a preferred embodiment of the present invention, namely, a method for manufacturing a magnetic tape cassette, which is to be read with reference to the accompanying drawings.

Figure 4:
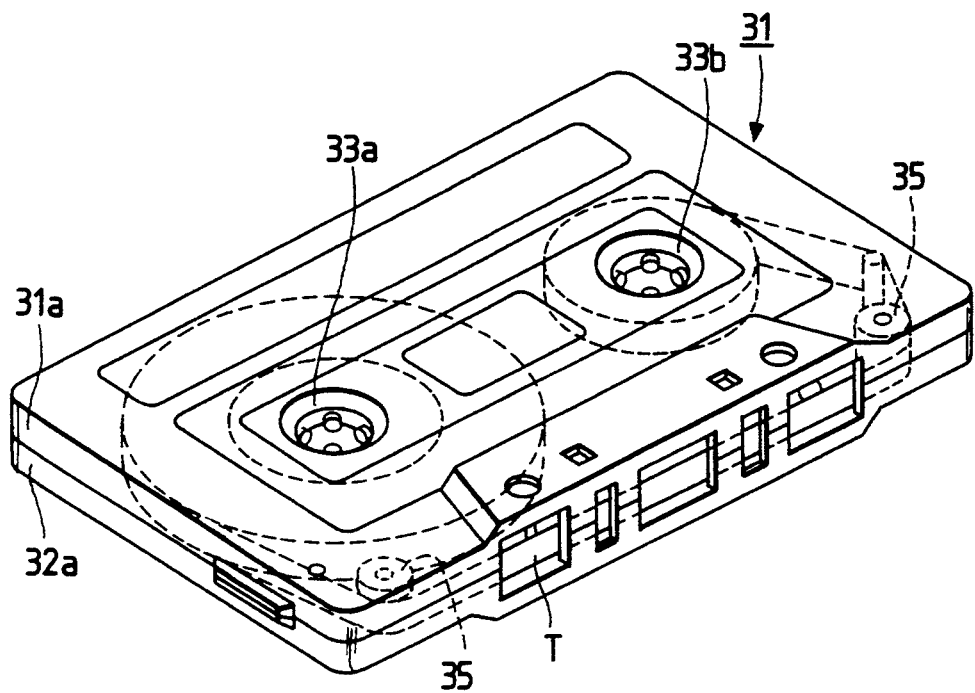
FIG. 4 is a perspective view of an audio magnetic tape cassette manufactured by the present method.
Figure 6:
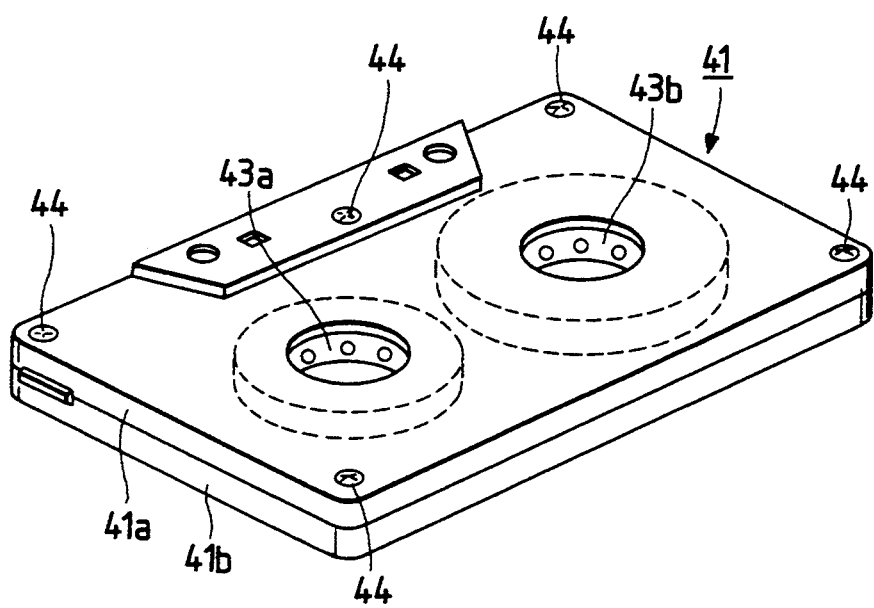
FIG. 6 is a perspective view of an audio magnetic tape cassette manufactured according to a conventional method.

The preferred embodiment, as shown in FIG. 4, is described with respect to an audio magnetic tape cassette 31. The magnetic tape cassette 31 is formed by combining upper and lower half cases 31a and 31b by the present method thereby eliminating the need for screws 44 (see FIG. 6) or other similar fastening means.

According to the present invention, each of the joints of the two half cases 31a, 31b has a contact-layer including the electrically conductive fillers 16 and resin 15. After the upper and lower half cases 31a, 31b are positioned in contact with each other, the contact-layer is then induction heated so as to fixedly secure the upper and lower half cases.

According to the present manufacturing method, the contact-layer electrically is provided to the joint rather than the entire outer perimeter of each half case.

Figure 1:
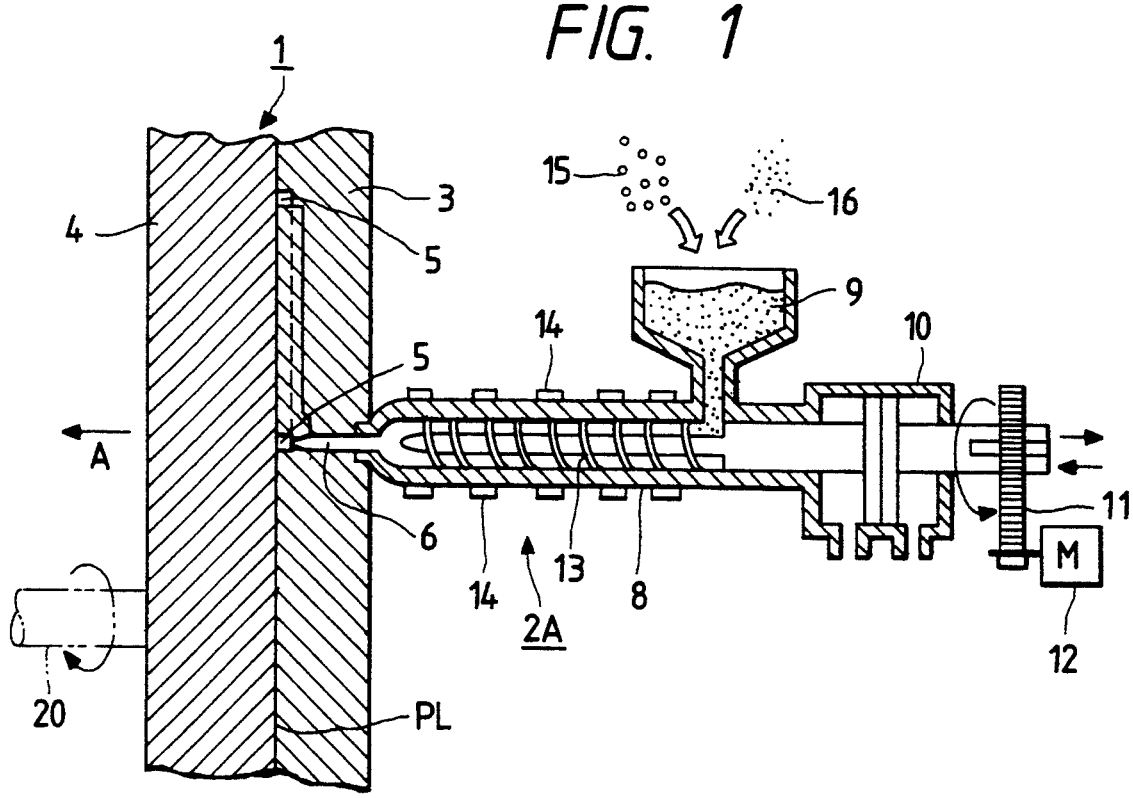
FIGS. 1 and 2 are schematic cross sectional views of an injection molding machine for injection molding half cases, the machine to be used to perform a cassette manufacturing method according to a preferred embodiment of the present invention.
Figure 2:
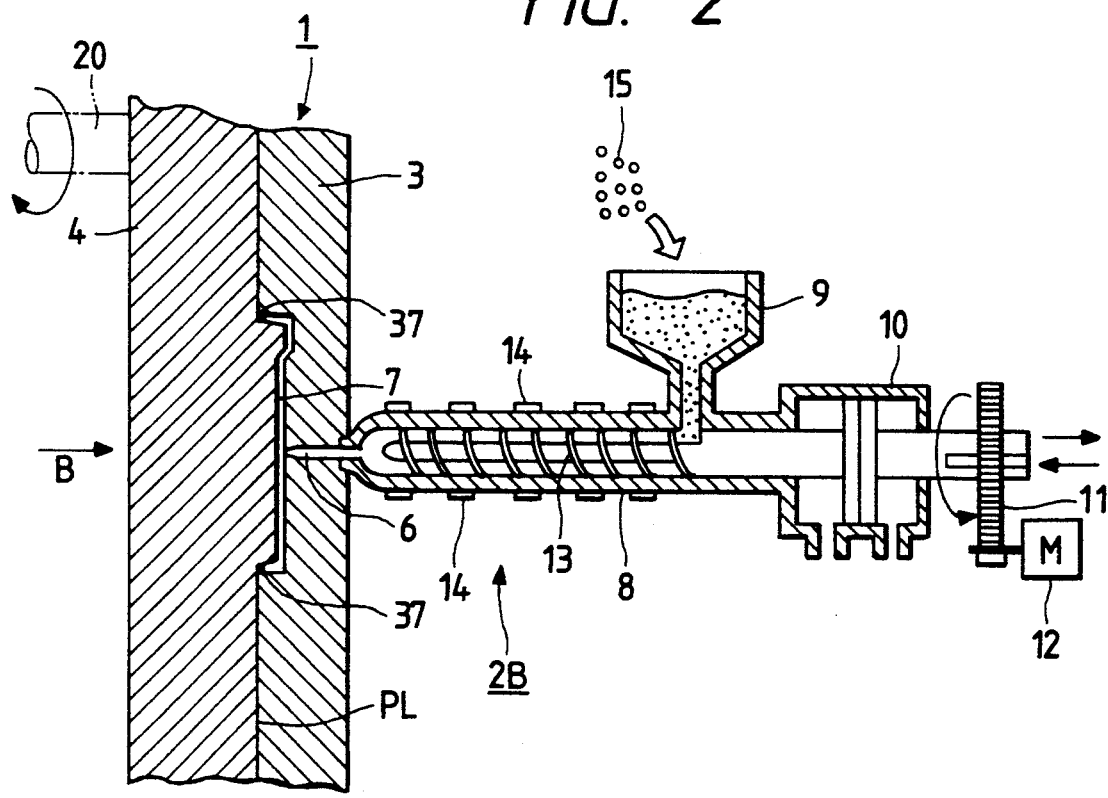

To manufacture the upper cassette shaft 31a as described above, the injection molding machines shown in FIG. 1, and 2 may be used. Each of the injection molding machines above generally comprises an injection molding die 1 and at least two screw-type injecting devices 2A and 2B which are respectively connected with a fixed mold member 3 of the injection molding die 1 by spacing their axes vertically.

The injection molding die 1 for molding the upper cassette half 31a comprises the fixed mold member 3 and a movable mold member 4.

There have been formed different cavities 5 and 7 between the joint of both the members 3 and 4 in turn as progressing the sequence of operation of molding the half 31a.

Each of the gates 6, 6 provided at the end portion of the injecting devices 2A and 2B is communicated with the cavities 5 and 7 respectively so that the fused resins can be injected through it into the cavities 5 and 7.

The injecting devices 2A and 2B are the so-called "screw-type injecting device" which comprises a hopper for feeding the pellets or particles of materials to be fused to the inside of the device, a heating cylinder 8 for heating and fusing the materials, a screw 13 for mixing and conveying the materials toward the gate 6, 6 and a hydraulic motor 12 for applying a turning effect through a reduction device 11 and a hydraulic cylinder 10 to the screw 11, thereby injecting the fused materials to the cavities 5 and 7, respectively.

Although each of the injecting devices 2A and 2B is shown in FIG. 1 and FIG. 2 separately these devices 2A and 2B are actually arranged so as to be connected with the common member i.e. the fixed mold member 3, and to be communicated separately to the cavities 5 and 7 as described above. On the other hand, the movable mold member 4 is constructed in such a manner that it can be rotated about a driving shaft 20 ( shown in FIG. 1 and FIG. 2 with a dot-dash-line).

The general function of the afore-mentioned injection molding machine will become more apparent upon a reading of the following description.

First, at a first injecting device 2A, a contact layer 37 including the conductive fillers and a resin is molded in the cavity 5 corresponding to the end portion of the peripheral wall of the upper cassette half 31a, by injecting the fused resin into the cavity 5.

When the fused resin in the cavity 5 is cooled and solidified, the movable mold member 4 is retracted backward (shown at arrow "A") accompanying the contact-layer 37 thereon.

Next, the movable mold member 4 is rotated about the driving shaft 20 until the member 4 reaches at the second shot stage (e.g. until 180°) into where another fused resin is injected from the another injecting device 2B, and then the member 4 is protruded forward (shown at arrow "B") so as to confine the cavity 7 with both members 3 and 4 by containing the contact-layer 37 as a part of the cavity 7.

When the cavity 7 is filled with the another fused resin not including such conductive fillers as used in the contact-layer 37, the upper cassette half 31a of a two-layer structure can be obtained.

Figure 3:
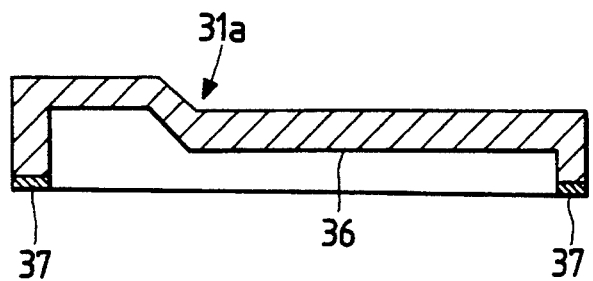
FIG. 3 is a schematic cross sectional view of a cassette half case manufactured by the present method.

The non-contact layer 36 (FIG. 3) of the upper cassette half 31a is formed from pellets 15 of high impact styrol, Acrylonitrile-Butadiene-Styrene resin, Acrylonitrile-Styrene resin, polystyrol resin or the like. By way of contrast, the contact layer 37 (FIG. 1) is formed from a mixture of one of the above-mentioned materials in addition to the conductive fillers 16 mentioned above.

The conductive filler 16 can be formed of, for example, one of a metal powder such as conductive carbon black, graphite, carbon baloon, silver, copper, nickel and the like, particulate materials such as $SnO_2$ powder and the like, flaky materials such as aluminum flake, nickel flake, Ni coated mica and the like, and fiber materials such as carbon fiber, brass fiber, aluminum fiber, copper fiber, stainless fiber, metallized glass fiber, carbon coat glass fiber, metallized carbon fiber and the like, or a combination thereof. By mixing the conductive fillers 16 with the pellets 15 in the respective hoppers 9 at different mixing ratios, the conductive property of the contact layer 37 can be changed as desired.

Next, a description will be given of a process for molding the upper cassette half 31a by means of the molding machine shown in FIGS. 1 and 2.

First, the contact layer 37 is molded. The molding materials within the hopper 9 fall into the heating cylinder 8 under the influence of gravity, is mixed and kneaded by means of the rotational movement of the screw 13, and is delivered along a groove formed around the shaft with the screw 13 to the leading end portion of the cylinders. During this operation, the molding materials are heated by a heater 14 positioned along an outer periphery of the heating cylinder 8. At the same time, the molding materials are also heated with frictional heat generated by such mixing and kneading treatments at the inside of the heating cylinder 8, thereby causing the molding material to fuse more quickly.

As the fused materials are stored in the leading end portion of the heating cylinder 8, the screw 13 is pushed back by a reaction force of the stored materials. A limit switch (not shown) detects the amount of the backward movement of the screw 13, thereby holding the screw 13 axially at a predetermined distance, thus ensuring the quantity of injection per shot.

The hydraulic cylinder 10 applies the injection pressure to the screw 13 such that the screw 13 acts as an injection plunger, injecting the fused materials under high pressure through the gate 6 into the cavity 5 of the injection molding die 1.

Once the fused materials are injected into the cavity 5, and cooled and solidified, the injection molding die 1 is opened, by retracting the movable mold member 4 backward accompanying the contact-layer 37 thereon.

Next, the movable mold member 4 is rotated about the driving shaft 20 until the member 4 is positioned at the second shot stage (e.g. until 180°) into where another fused resin is injected from the another injecting device 2B, and then the member 4 is protruded forward (shown at arrow "B") so as to confine the cavity 7 with both members 3 and 4 by containing the contact-layer 37 as a part of the cavity 7.

When the cavity 7 is filled with the another fused resin not including such conductive fillers as used in the contact-layer 37, the upper cassette half 31a of a two-layer structure can be obtained.

The above-mentioned upper cassette half 31a of a two-layer structure is formed by the above-mentioned two-layer molding steps and, finally, the molded product of the upper cassette half 31a is removed from the injection molding die 1 with the aid of a projecting pin (not shown). The lower cassette half 31b is molded and removed in the same manner as in the upper cassette half 31a.

Prior to combining the upper and lower half cases 31a and 31b molded from the above-described method, hubs 33a, 33b, guide roller 35, and parts such as a shield plate or a spring member having a tape pad are provided within the lower half case 31b. A leader tape whose end portions are secured to each of the hubs 33a and 33b is threaded along the predetermined tape path. The magnetic tape T is not incorporated until after the step of induction heating is over in order to prevent the magnetic tape T from being heated by the induction heating.

It should be noted that the molding materials of the layer 36 may contain additives such as antistatics, antioxidants, ultraviolet preventives and the like, and dispersants or lubricants within a range so as not to impair the function of the layer 36.

Figure 5:
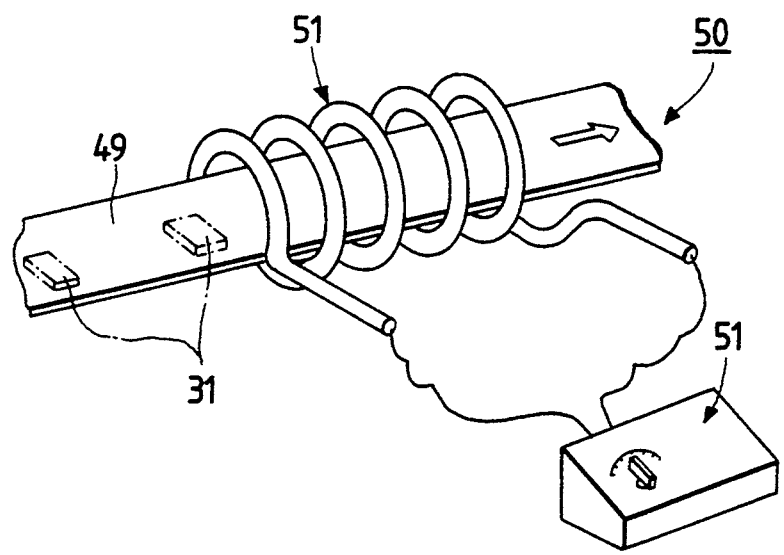
FIG. 5 is a conceptual view of the basic structure of an induction heating device to be used in performing the present method.

The upper and lower half cases 31a, 31b pass through a heating coil 51 of an induction heating device 50 as shown in FIG. 5. During this process, the upper and lower half cases 31a, 31b are held by and between suitable pressurizing devices. While the upper and lower half cases 31a, 31b are delivered through the heating or induction coil 51 by a delivery device 49, a current of a desired frequency is applied from a high frequency generating source 52 to the coil 51 so as to generate an alternating electric field within the induction coil 51. The application of such an electric field causes the contact layers 37 of the upper and lower half cases 31a, 31b to generate joule heat as they pass through the field. As a result, the joints provided with the contact layers 37 are fused and connected together. Furthermore, the upper and lower half cases 31a, 31b are bonded and fixed to each other over the entire region of the joints.

After the upper and lower half cases 31a, 31b are bonded and fixed together, a part of the leader tape is drawn out from the assembled cassette case and cut, and a magnetic tape is connected to one end of the cut leader tape leading to one of the hubs. That hub is then rotated to roll in a given length of magnetic tape. The other end of the magnetic tape is connected to the other cut end of the leader tape, and the remaining portion of the leader tape drawn out from the cassette is rolled in the assembled cassette case so as to complete the assembly process.

The inventive method described above eliminates the need for the screws as usually used in the conventional cassette and the attendant complications. Also, since the upper and lower half cases are fixedly secured over the entire joint areas thereof, the inventive method avoids generating uneven stresses over the joint as often seen in the conventional cassette due to the partial fastening system. Furthermore, the inventive method decreases the likelihood of deformation of the cassette in high-temperature environments.

Although the above description explains some preferred embodiments of the invention, the invention is not limited to the injection molding machine illustrated herein. Various other kinds of injection molding machines can be used to perform the inventive method. Furthermore, materials other than resin pellets and conductive fillers can be selected as molding materials.

In the preferred embodiment described above, the half cases are manufactured using a two-layer molding method. However, the contact layers of the half cases can be molded by other methods. For example, the contact layers can be molded by transfer molding method.

Furthermore, in the preferred embodiment described above, the conductive fillers are contained only in the contact-layer of each of the half cases. However, the conductive fillers may be mixed over the entire periphery of the half case.

Furthermore, the preferred embodiment described above relates to an audio magnetic tape cassette, however, the invention is not limited to the audio magnetic tape cassette. The invention can also be applied to various other injection molded products such as video cassettes, optical disc cartridges and the like.

As described above, the cassette manufacturing method of the present invention includes the steps of, containing conductive fillers in at least the contact layer of the two half cases, incorporating related members except for the magnetic tape into the case, putting the one half cases upon another, and heating the upper and lower half cases by an induction heating method to bond and secure the upper and lower half cases.

Thus, according to the present invention, the fastening steps as seen in the conventional art and their attendant complications are eliminated. Also, as a result of the fact that the upper and lower half cases are fixed over the entire periphery thereof, uneven stresses in the half case joint portions caused by the conventional partial fastenings, such as fastening by use of screws, can be avoided. Furthermore, the potential for deformation of the cassette case is lessened, even in high temperature environments.

What is claimed is:

1. A method for manufacturing a magnetic tape cassette incorporating and holding therein a tape winding member with a magnetic tape wound therearound in a cassette case comprising a combination of upper and lower half cases formed from a synthetic resin, said method comprising the steps of:

injection molding at least one of said upper and lower half cases with a resin material mixed with a conductive filler;

putting said upper and lower cases one upon another; and exposing said upper and lower half cases to induction heating to thereby heat at least a joint which joins each of said half cases to bond and fix said upper and lower half cases together.

2. The method for manufacturing a magnetic tape cassette of claim 1, further comprising the step of providing related members except for said magnetic tape within said upper and lower half cases prior to said step of putting said one half cases upon another, and the step of winding said magnetic tape around said tape winding member subsequent to said step of exposing said upper and lower half cases to induction heating.

3. The method for manufacturing a magnetic tape cassette of claim 1, wherein said resin material is selected from the group consisting of high impact styrol, acrylonitrile-Butadiene-Styrene resin, Acrylonitrile-Styrene resin, and polystyrol resin.

4. The method for manufacturing a magnetic tape cassette of claim 1, wherein said conductive filler is selected from the group consisting of powders of conductive carbon black, graphite, silver, copper, nickel; particulate $SnO_2$ powder; flakes of aluminum, nickel, and Ni coated mica; and fibers of carbon, brass, aluminum, copper, stainless steel, metallized glass, carbon coated glass, and metallized carbon.

5. The method for manufacturing a magnetic tape cassette of claim 1, further comprising the step of pressing said upper and lower half cases together during said step of exposing said half cases to induction heating.

6. A method for manufacturing a magnetic tape cassette incorporating and holding therein a tape winding member with a magnetic tape wound therearound in a cassette case comprising upper and lower half cases formed from a synthetic resin and respectively including side walls, comprising the following steps:

closing a moveable mold half with a first stationary mold half to define a first mold cavity having a shape corresponding to the end portion of the side wall of the upper half case;

injecting a contact resin including a first resin material mixed with a conductive filler into said first mold cavity to form a contact layer along said end portion;

cooling said contact resin to a cured state;

moving the moveable mold half and the molded contact layer away from the first stationary mold and closing said moveable mold half and the molded contact layer with a second stationary mold, said moveable mold, said molded contact layer and said second stationary mold defining a second mold cavity;

injecting a second resin material into said second mold cavity to form the remaining portion of said upper case half;

cooling said second resin material into a cured state;

removing said upper case from said moveable mold half and said second stationary mold half;

putting said upper and lower half cases upon one another with said contact layer contacting said lower case half; and exposing said upper and lower half cases to induction heating to thereby heat at least said contact layer to bond and fix said upper and lower case halves together.

7. The method for manufacturing a magnetic tape cassette of claim 6, further comprising the step of providing related members except for said magnetic tape within said upper and lower half cases prior to said step of putting said half cases upon one another, and the step of winding said magnetic tape around said tape winding member subsequent to said step of exposing said upper and lower half cases to induction heating.

8. The method for manufacturing a magnetic tape cassette of claim 6, wherein said second resin material is selected from the group consisting of high impact styrene, acrylonitrile-Butadiene-Styrene resin, Acrylonitrile-Styrene resin, and polystyrol resin.

9. The method for manufacturing a magnetic tape cassette of claim 6, wherein said conductive filler is selected from the group consisting of powders of conductive carbon black, graphite, silver, copper, nickel; particulate $SnO_2$ powder; flakes of aluminum, nickel, and Ni coated mica; and fibers of carbon, brass, aluminum, copper, stainless steel, metallized glass, carbon coated glass, and metallized carbon.

10. The method for manufacturing a magnetic tape cassette of claim 6, further comprising the step of pressing said upper and lower half cases together during said step of exposing said half cases to induction heating.

* * * * *